(12) United States Patent
 Johnson

(10) Patent No.: US 10,562,341 B1
(45) Date of Patent: Feb. 18, 2020

(54) ELECTRONIC HUB DEVICE

(71) Applicant: Melvin Johnson, Dallas, TX (US)

(72) Inventor: Melvin Johnson, Dallas, TX (US)

( * ) Notice: Subject to any disclaimer, the term of this patent is extended or adjusted under 35 U.S.C. 154(b) by 0 days.

(21) Appl. No.: 16/163,797

(22) Filed: Oct. 18, 2018

(51) Int. Cl.
 *B60B 7/04* (2006.01)
 *B60B 7/00* (2006.01)
 *B60B 7/08* (2006.01)

(52) U.S. Cl.
 CPC ............... *B60B 7/04* (2013.01); *B60B 7/006* (2013.01); *B60B 7/0013* (2013.01); *B60B 7/08* (2013.01)

(58) Field of Classification Search
 CPC .............................. B60Q 1/326; G09F 21/045
 USPC .................................................... 340/851.45
 See application file for complete search history.

(56) References Cited

U.S. PATENT DOCUMENTS

| | | | | |
|---|---|---|---|---|
| 5,791,966 A | * | 8/1998 | Capps | A63H 1/24 362/249.16 |
| 2008/0101053 A1 | * | 5/2008 | Hoffman | G09F 21/045 362/35 |
| 2009/0015057 A1 | * | 1/2009 | Groomes | B60B 7/20 301/37.108 |
| 2013/0182228 A1 | * | 7/2013 | Ishikawa | G09F 21/045 353/13 |
| 2017/0190083 A1 | * | 7/2017 | Zhou | B29C 45/16 |

* cited by examiner

*Primary Examiner* — Fabricio R Murillo Garcia
(74) *Attorney, Agent, or Firm* — Sanchelima & Associates, P.A.; Christian Sanchelima; Jesus Sanchelima

(57) ABSTRACT

The present invention is an electronic hub device that comprises a frame mounted on a pole structure of an object. Frame comprises one or more sensors configured to detect one or more events around electronic hub device, and a plurality of light sources installed along a boundary of frame configured to illuminate a portion of frame within boundary of frame. Portion of frame includes promotional content selected based on user preferences. Frame further comprises a processor configured to activate plurality of light sources upon detection of one or more events.

15 Claims, 8 Drawing Sheets

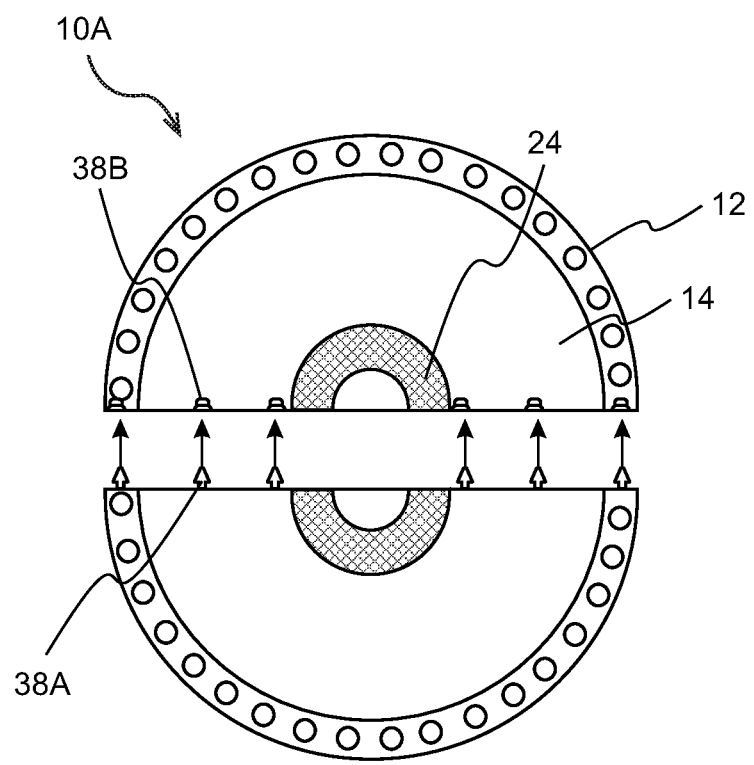
FIG. 1B
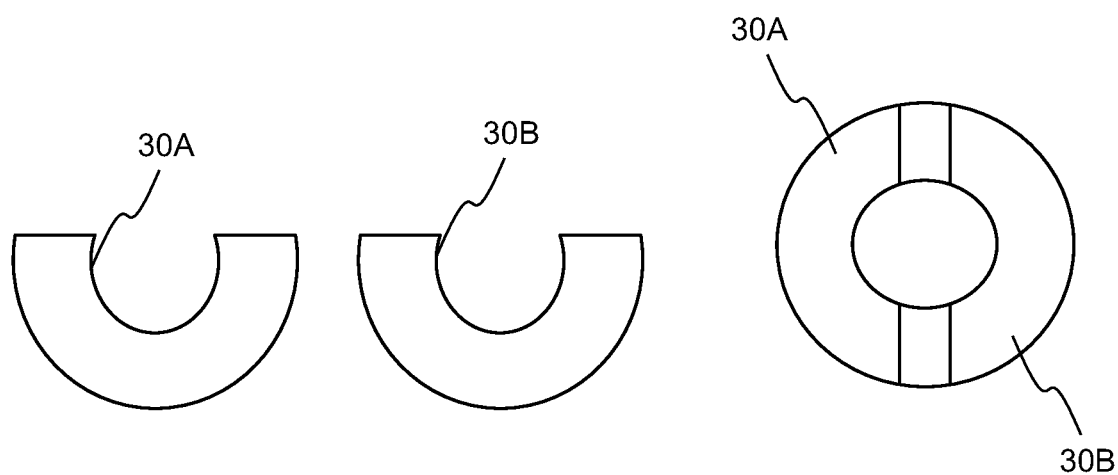
FIG. 1C
FIG. 1D

ELECTRONIC HUB DEVICE

BACKGROUND OF THE INVENTION

1. Field of the Invention

The present disclosure relates to an electronic hub device. More particularly, the present disclosure relates to an electronic hub device configured to be installed on a plurality of objects.

2. Description of the Related Art

Simply put, a hubcap is a cover placed on the "hub", which is the central portion of a rotating object, such as a wheel. Hubcap is usually a small cover made of metal or plastic that safeguards the lug nuts from dirt and moisture and also prevents the lug nuts from falling out. Hubcaps are mostly decorative accessories noted to give the rotating objects an overall attractive, tidier, and stylish appearance.

Several designs of such hubcaps have been presented in the past. None of them, however, presents a simple, creative, interactive, and promotional electronic hub device that may be designed and customized based on user preferences and which could be mounted on generic objects, like chairs, in a facility, such as workstation, game room, man caves, sports bar, business place, shop, salon, retail stores, restaurants, or other such place.

Applicant believes that a related reference corresponds to US patent number US20070228807A1 filed by Jerry Leslie that discloses a customized hubcap attachment system to provide interchangeable hubcaps allowing use of different ornamental hubcaps for different occasions. The hubcap attachment system includes a wheel with an interior rim, a hubcap mount attachable to wheel interior rim, and a hubcap plate removably attachable to the hubcap mount. However, such hubcaps are targeted to only enhance aesthetic appearance of a wheel.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide an electronic hub device, comprising a frame mounted on a pole structure of an object, wherein frame comprises one or more sensors configured to detect one or more events around hub device, a plurality of light sources installed along a boundary of frame configured to illuminate a portion of frame within boundary of frame, wherein portion of frame includes promotional content selected based on user preferences, a processor configured to activate plurality of light sources upon detection of one or more events, and a battery configured to provide power to plurality of light sources.

In an embodiment, a central axis of frame coincides with longitudinal axis of pole structure of object. One or more sensors are one or more of a motion sensor, an audio sensor, a proximity sensor, or a pressure sensor. One or more events correspond to a presence of another object within proximity of hub device, a movement of other object within proximity of hub device, a voice command, an audio gesture, or a pressure exerted on object.

In an embodiment, hub device further comprises a remote device, communicably coupled with hub device, configured to control one or more operations of hub device. One or more operations may correspond to switching on hub device, switching off hub device, controlling a speaker device installed on hub device, or controlling a rotation of hub device.

In an embodiment, battery is powered from an external power supply. The processor is further configured to activate an electric motor installed at inner portion of frame. Electric motor is configured to rotate frame about a central axis of frame around pole of object upon receiving an activation signal from processor. Processor is further configured to activate a speaker device installed at inner portion on upper surface of frame, wherein speaker device is configured to pair with one or more portable devices to generate an audio output.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIGS. 1, 1A and 1B represent a top, bottom, and top split views respectively of an electronic hub device, according to an embodiment described herein.

FIGS. 1C and 1D represent a locking mechanism of electronic hub device, according to an embodiment described herein.

DETAILED DESCRIPTION OF THE EMBODIMENTS OF THE INVENTION

Figure 1:
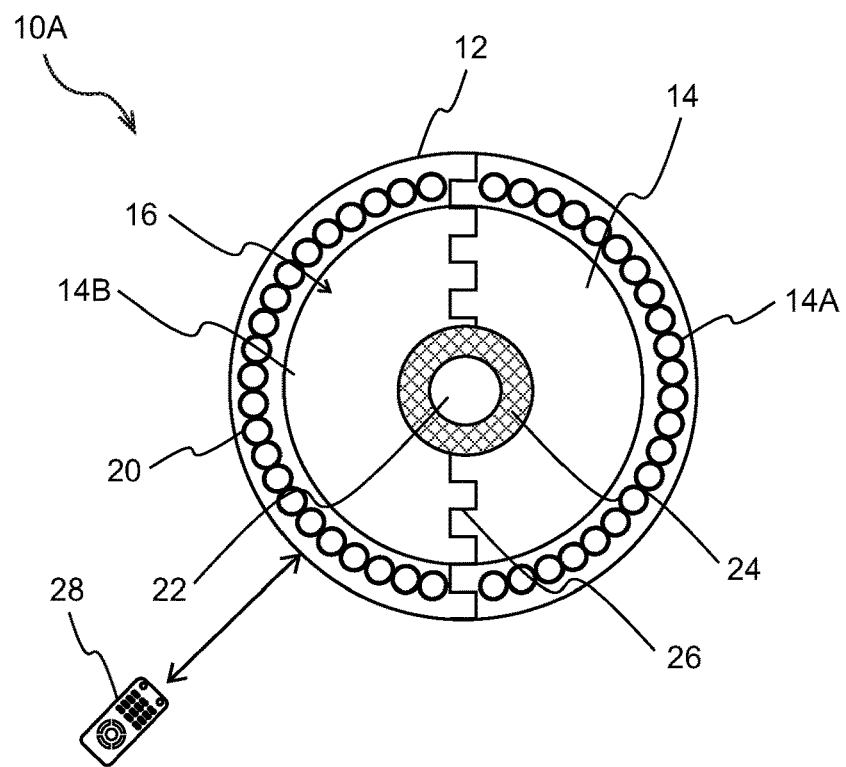

Referring now to the drawings, FIGS. 1-4I, where the present invention is generally referred to with numeral 12, it can be observed that an electronic hub device, in accordance with one embodiment, is provided that includes various components, a described hereinafter.

Figure 1A:
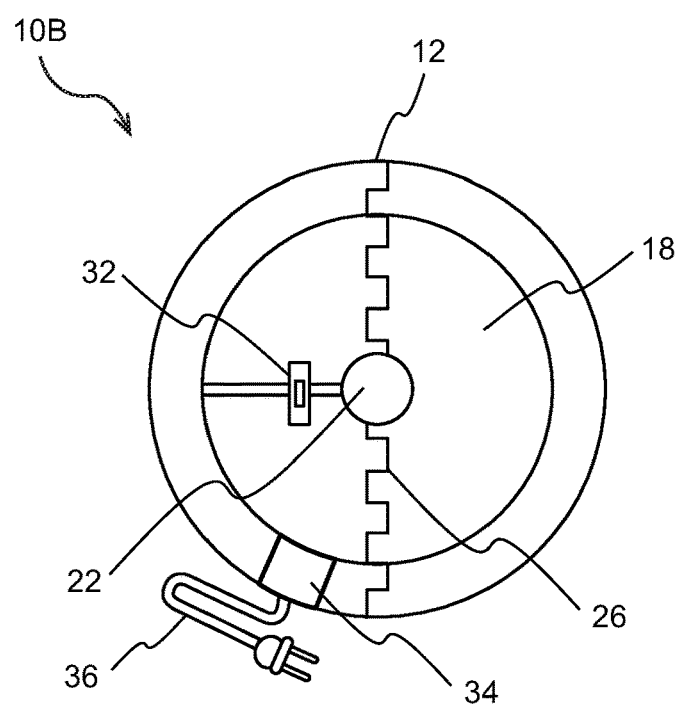

FIG. 1 represents a top view 10A of electronic hub device 12 and FIG. 1A represents a bottom view 10B of electronic hub device 12, according to an embodiment described herein.

Referring to FIG. 1, there is shown top view 10A of upper surface 16 of a frame 14 of electronic hub device 12. Frame 14 has a boundary portion 14A and an inner portion 14B within boundary portion 14A of frame 14. Boundary portion 14A includes a plurality of light sources 20, for example light emitting diodes (LEDs) or other such light emitting components. Inner portion 14B of frame 14 comprises an area on which promotional content, selected by a user based on user preferences, may be affixed.

Figure 3:
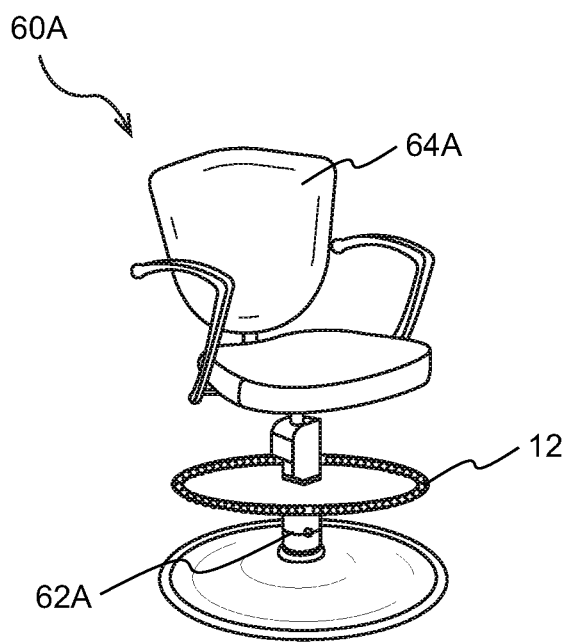
FIGS. 3-3D represent multiple objects upon which electronic hub device may be mounted, according to an embodiment described herein.
Figure 3A:
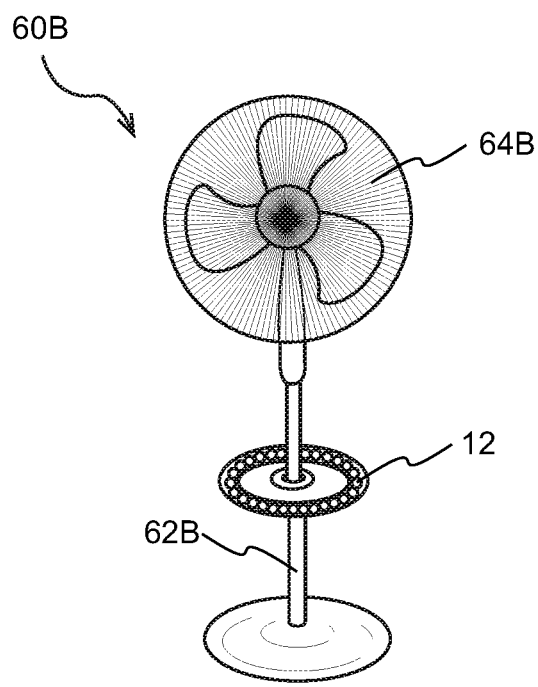
Figure 3B:
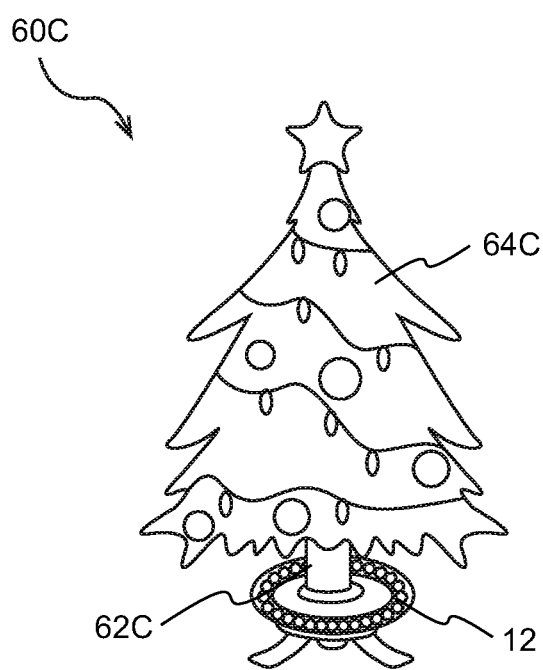
Figure 3C:
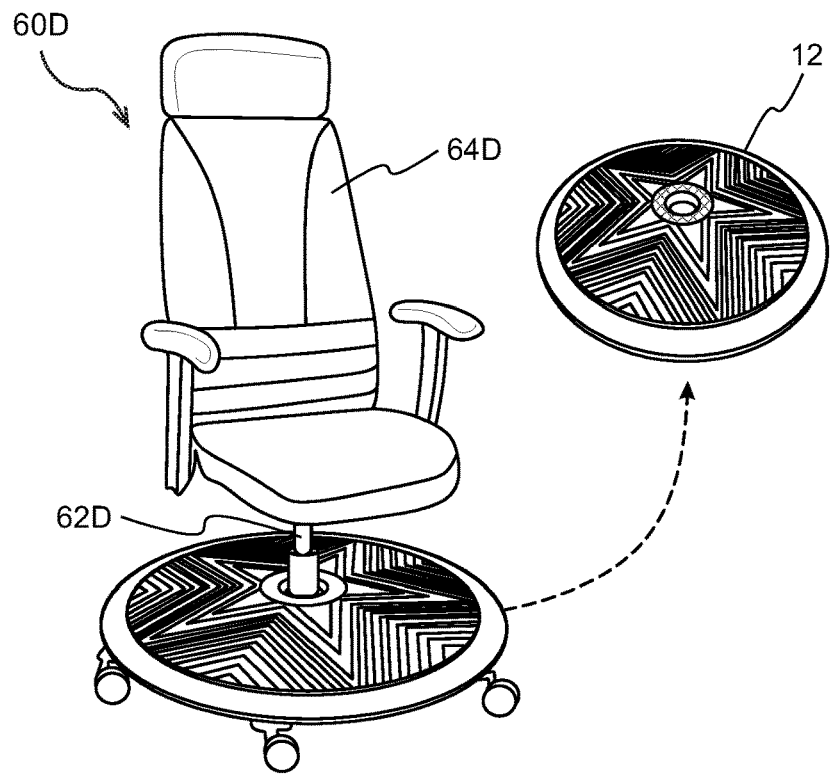
Figure 3D:
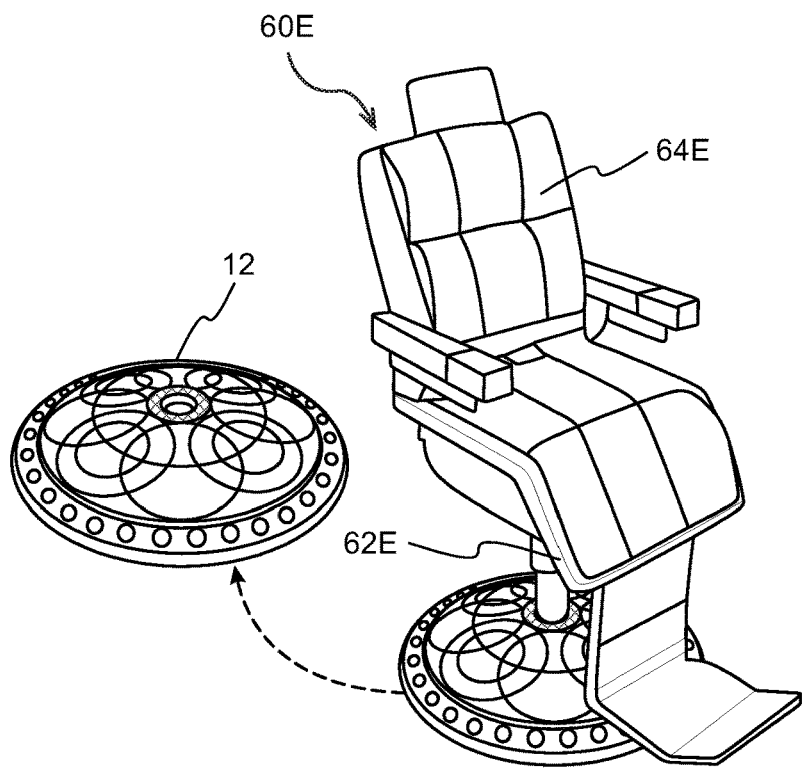

At center of frame 14, there is shown a cavity 22 configured to be engaged with a pole structure of an object, further illustrated in FIGS. 3-3D. Around cavity 22, there may be located a wireless speaker device 24, such as a Bluetooth speaker, that may be configured to be paired with one or more portable devices to generate audio outputs. Frame 14 of electronic hub device 12 may include a connector 26 at which frame 14 may be unassembled while mounting on pole structure of object, and may be assembled once mounted on pole structure of object. Connector 26 may be an interlocking seam extending through center of frame 14. Frame 14 of electronic hub device 12 may be mounted in such a manner that a central axis of frame 14 coincides with longitudinal axis of pole structure of object. There is further shown a remote device 28, communicably coupled with electronic hub device 12, configured to control one or more operations of electronic hub device 12. One or more operations may correspond to switching on electronic hub device 12, switching off electronic hub device 12, controlling wireless speaker device 24 installed on electronic hub device 12, or controlling a rotation of electronic hub device 12.

Referring to FIG. 1A, there is shown bottom view 10B of lower surface 18 of frame 14 of electronic hub device 12. Cavity 22 and connector 26, as illustrated, may be similar to the ones described in FIG. 1. There are further shown a plurality of clamps 32 configured to fix or hold electronic hub device 12 in place, once mounted on pole structure of object. Apart from clamps 32, there may be other mechanical or fluidic means to fix or hold electronic hub device 12 in place on pole structure of object at a desired height. There is further shown a battery 34 configured to provide power to plurality of light sources 20, wireless speaker device 24, electric motors, and sensors, upon activation. Battery 34 may be powered from an external power supply via a power cable 36. There may be other electronic components also that may be mounted on lower surface 18 of frame 14 to maintain aesthetic appeal of electronic hub device 12. For example, there may be one or more sensors configured to detect one or more events around electronic hub device 12, a processor configured to activate plurality of light sources 20 upon detection of one or more events, an electric motor configured to rotate frame 14 about central axis of frame 14 around pole structure of object upon receiving an activation signal from a processor, described in detail in FIG. 2.

In an embodiment, material of frame 14 of electronic hub device 12 may be durable plastic, shape may be circular, and size may be anywhere between 24 inches to 32 inches. Frame 14 of electronic hub device 12 may be integrated with electrical and lighting components. Inner portion of frame 14 may be decorated with various colors and artistic designs. However, the disclosure may not be so limiting, and other lightweight materials, colors, styles, shapes, and sizes may also be contemplated, without deviation from the scope of the disclosure. The overall idea of the present disclosure is to provide electronic hub device 12 that, by use of various means, such as light show (for example, ring of LEDs lining outer perimeter of frame 14) and audio rendering, may provide user an opportunity (by displaying name and logo of business imprinted on frame 14) to display their brands, personality, creativity, and professional engagements in a more aesthetically appealing manner, and giving other users, such as customers or clients, a delightful user experience.

Referring to FIG. 1B, there is shown split top view 10A of upper surface 16 of frame 14 of electronic hub device 12. Frame 14 of electronic hub device 12 is shown to be unassembled along interlocking seam connector 26 which is extending through center of frame 14, while mounting on pole structure of object. Frame 14 of electronic hub device 12 may be unassembled by pulling interlocking seam to allow disengagement of frame 14 at boundary of cavity 22 from pole of chair. Frame 14 of electronic hub device 12 may be assembled by adjusting two split boundaries of cavity 22 to snugly fit along pole of object, such as a chair, and snap fit once mounted on pole structure of object. Snap fitting may be performed using lock stick-out end 38A positioned on one half of frame 14 and lock insert end 38B positioned on other half of frame 14. Thus, cavity 22 of frame 14 may snugly fit around bottom of pedestal.

FIGS. 1C and 1D represent a locking mechanism of electronic hub device, according to an embodiment described herein. Locking mechanism, as illustrated in FIGS. 1C and 1D allows for electronic hub device 12 to stay in place on pole structure of object. Locking mechanism may include "U" shaped locks, such as 30A and 30B as illustrated in FIG. 1C. Locks 30A and 30B may be adjustable and may circle around pole structure of object, as illustrated in FIG. 1D. Locks 30A and 30B may be designed to fit all sizes of pole structures of different objects and may be locked and unlocks very easily through various fastening mechanisms, such as snap fitting or friction fitting. Locks 30A and 30B may be attached towards bottom of electronic hub device 12 to provide a support and prevent it from falling down.

Figure 2:
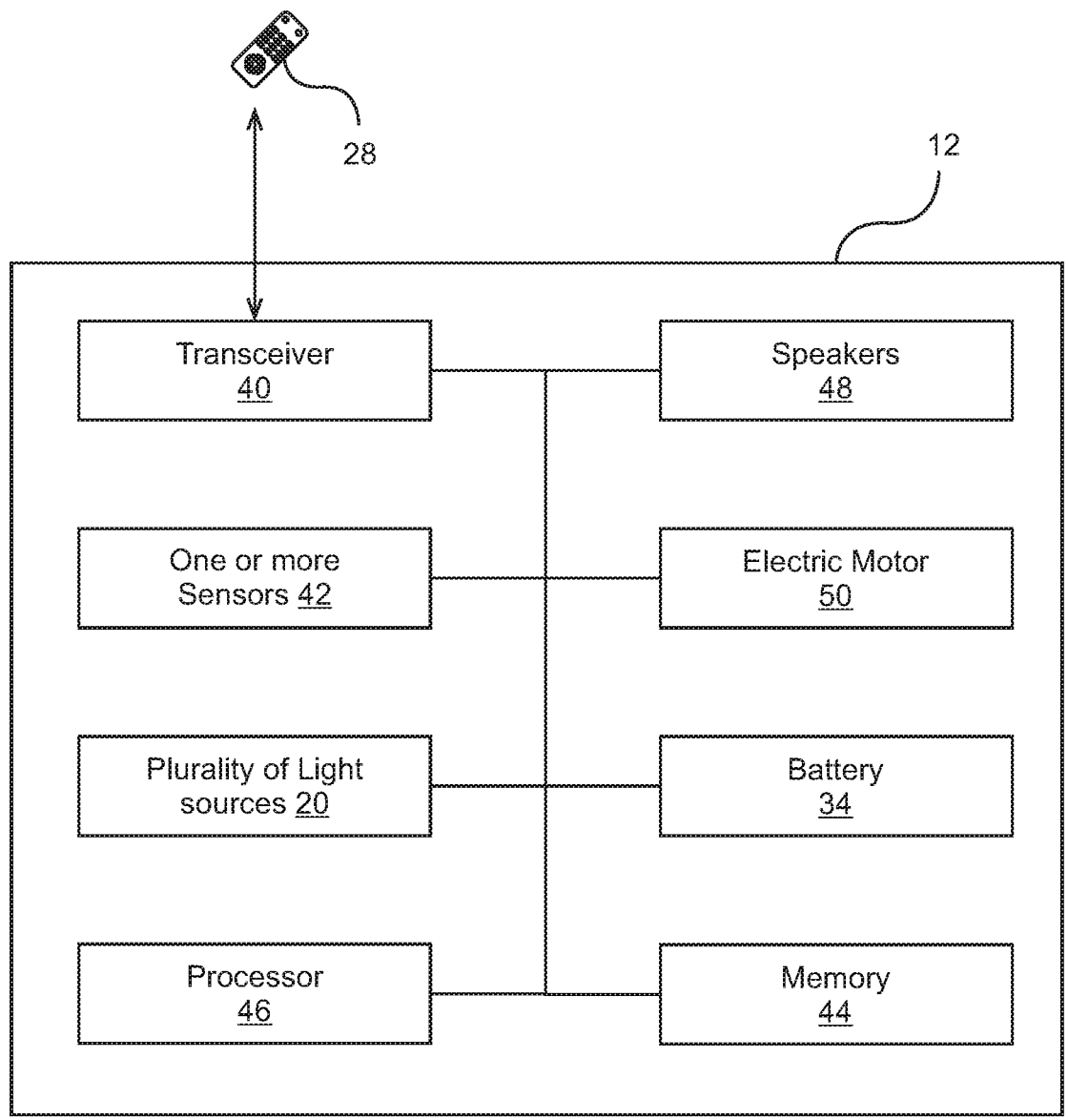
FIG. 2 represents a block diagram of electronic hub device, according to an embodiment described herein.

FIG. 2 illustrates a block diagram of electronic hub device 12, according to various embodiments described herein. Electronic hub device 12 may include a transceiver 40, one or more sensors 42, a memory 44, a processor 46, speakers 48, and electric motor 50, in addition to plurality of light sources 20, remote device 28, and battery 34 described above in FIGS. 1 and 1A.

Transceiver 40 may be configured to implement known technologies to support wireless communication, for example infrared protocols, to receive infrared signals from other devices, such as remote device 28. Transceiver 40 may also be configured to support other short distance wireless communication protocols, such as Bluetooth protocols, while pairing speakers 48 with external portable devices.

One or more sensors 42, such as motion sensor, a light sensor, camera sensor, audio sensor, proximity sensor or pressure sensor, may be configured to detect one or more events around electronic hub device 12, and cause processor 46 to activate, for example at least plurality of light sources 20, located on frame 14, based on detected one or more events.

Processor 46, as described above, may be configured to activate light sources 20, located on upper surface 16 of frame 14, based on detected one or more events. Processor 46 may be further configured to activate electric motor 50 installed at lower surface 18 of inner portion of frame 14. Processor 46 may be further configured to activate speakers 48 installed on upper surface 16 of inner portion 14B of frame 14. Further, processor 46 may be configured to generate an alert notification based on one or more critical events, such as low battery or loose connection event. Such generated alert notifications are rendered by I/O devices, such as flash light, beeper, and/or the like. Processor 46 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a digital signal processor (DSP), a coprocessor, and/or other processors or integrated circuits.

Speakers 48 may correspond to wireless speaker device 24 configured to be paired with one or more portable devices associated with one or more users and generate an audio output. In an embodiment, speakers 48 may be installed at inner portion 14B of upper surface 16 of frame 14 and may be activated based on an activation signal received from processor 46.

Electric motor 50 may be installed at inner portion 14B of frame 14 and may be configured to rotate frame 14 about a central axis of frame 14 around pole structure of object upon receiving an activation signal from processor 46. Electric motor 50 may be engaged with inner portion 14B of frame 14 through a gear and belt assembly, wherein inner portion 14B is engaged with pole structure through a bearing assembly (not shown). In an embodiment, activation signal may be initiated by processor 46 based on an infrared command received from remote device 28.

Battery 34 may be configured to provide power to plurality of light sources 20 and other electronic and electrical components of electronic hub device 12. In an embodiment, battery 34 may be powered from an external power supply via power cable 36, as illustrated in FIG. 1. In an embodiment, battery 34 may be a lithium-ion battery that is small, durable, and having long life. Alternatively, battery 34 may be a chargeable battery that may be recharged when power level drops below a threshold power level.

Memory 44 may be configured to temporarily store various data, such as energization pattern of plurality of light sources 20 and plurality of pre-recorded music files that may be retrieved by processor 46 based on a selection provided by a user via remote device 28.

Figure 4:
FIGS. 4-4I represent use cases illustrating implementation of electronic hub device, according to an embodiment described herein.
Figure 4A:
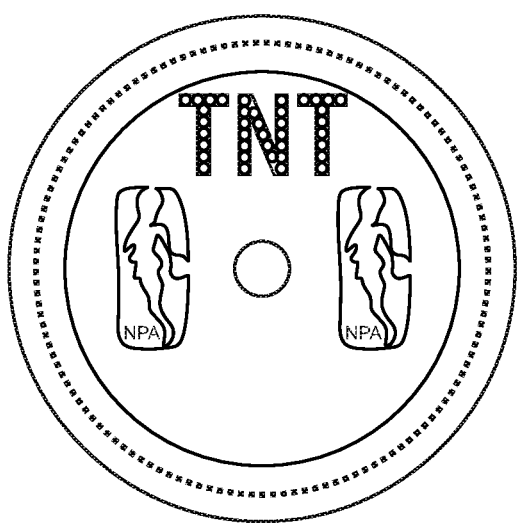
Figure 4B:
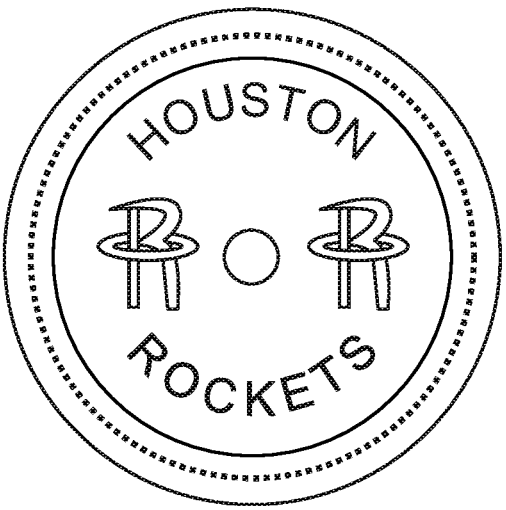
Figure 4C:
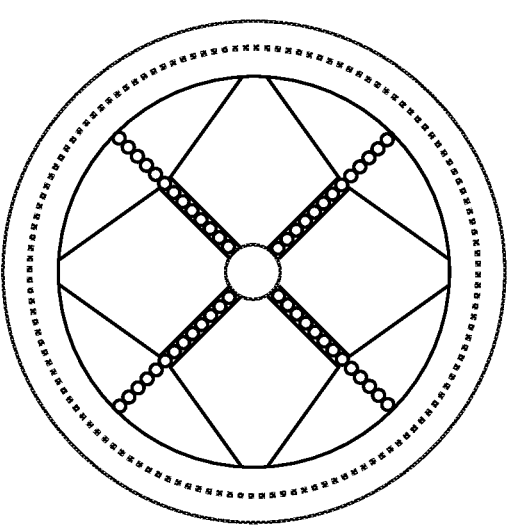
Figure 4D:
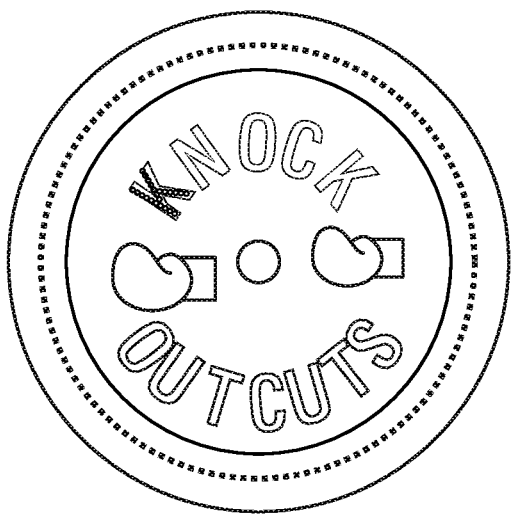
Figure 4E:
Figure 4F:
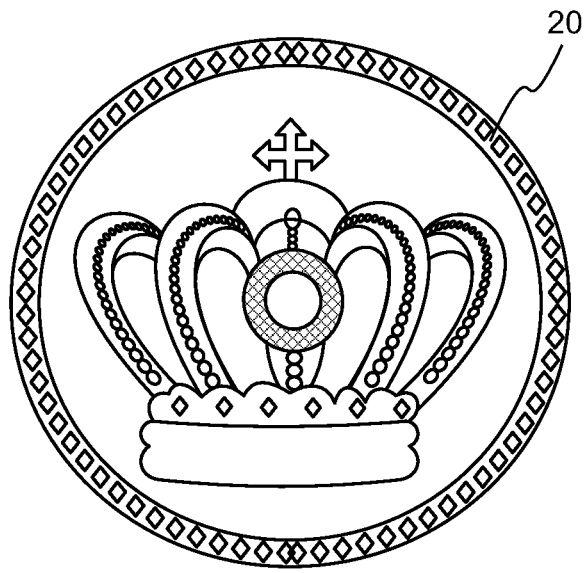
Figure 4G:
Figures 4H, 4I:
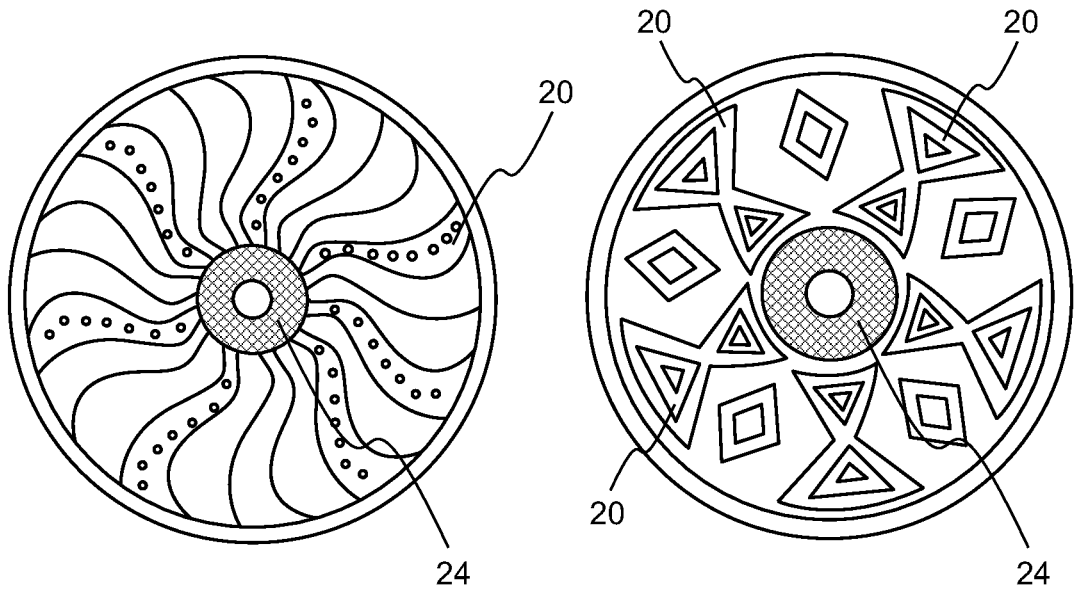

FIGS. 3-3D represents multiple objects upon which electronic hub device 12 may be mounted, according to various embodiments described herein. FIGS. 4-4I represent use cases illustrating implementation of electronic hub device 12, according to various embodiments described herein.

Referring to FIG. 3, there is shown a first object, such as a salon chair 60A having a round base upon which a pole structure 62A is mounted. Towards upper end of pole structure 62A, there is mounted a seating arrangement 64A. Electronic hub device 12 may be mounted on pole structure 62A at a defined height from base of salon chair 60A. In an example use case, when a customer enters a salon and proceeds towards salon chair 60A, a proximity sensor detects presence of customer and automatically switches on and illuminates plurality of light sources 20. A pre-stored promotional voice message may be rendered via speakers 48. Plurality of light sources 20 may be illuminated according to a pattern selected by salon owner via remote device 28. Electronic hub device 12 may also start rotating upon receiving an activation signal from processor 46. Processor 46 may generate activation signal based on a command received from remote device 28 in response to selection of a button on remote device 28 by salon owner. In an instance, portion of frame 14 of electronic hub device 12 may include promotional content selected based on preferences of salon owner, for example, aesthetic design shown in FIG. 4.

Notwithstanding, the disclosure may not be limited to salon chair, as described above in exemplary use case. Electronic hub device 12 may be mounted on other types of chairs, such as office chair, game chair, or other such chairs having a pole structure. In such instances, portion of frame 14 of electronic hub device 12 may include promotional content selected based on preferences of employee, a game player, or other such user, for example, aesthetic designs shown in FIGS. 4A, 4B, and 4D. It may be noted that employee, game player, or other such user may further customize aesthetic design of electronic hub device, based on preferences.

Referring to FIG. 3A, there is shown a second object, such as a standing fan 60B, having a round base upon which a pole structure 62B is mounted. Towards upper end of pole structure 62B, there is mounted a fan assembly 64B. Electronic hub device 12 may be mounted on pole structure 62B at a defined height from base of standing fan 60B placed in a facility, such as at home of a user. In an example use case, when user heads towards standing fan 60B, a proximity sensor detects presence of user and automatically switches on and illuminates plurality of light sources 20. A pre-stored promotional voice message may be rendered via speakers 48. Plurality of light sources 20 may be illuminated according to a default pattern. Electronic hub device 12 may also start rotating upon receiving an activation signal from processor 46. Processor 46 may generate activation signal based on a command received from remote device 28 in response to selection of a button on remote device 28 by user. User may further pair a portable device with speakers 48 and play favorite playlist. In an instance, portion of frame 14 of electronic hub device 12 may include promotional content selected based on preferences of user, for example, aesthetic design shown in FIG. 4C.

Referring to FIG. 3B, there is shown a third object, such as a Christmas tree 60C, having base legs upon which a pole structure 62C is mounted. Towards upper end of pole structure 62C, there is mounted leaves and decorative items 64C. Electronic hub device 12 may be mounted on pole structure 62C at a defined height from base of Christmas tree 60C placed in a facility, such as at home of a user. In an example use case, when user moves near Christmas tree 60C, a motion sensor detects movement of user and automatically switches on and illuminates plurality of light sources 20. Pre-stored Christmas jingles may be rendered via speakers 48. Plurality of light sources 20 may be illuminated according to a default pattern. Electronic hub device 12 may also start rotating upon receiving an activation signal from processor 46. Processor 46 may generate activation signal based on a command received from remote device 28 in response to selection of a button on remote device 28 by user. In an instance, portion of frame 14 of electronic hub device 12 may include festive content selected based on preferences of user, for example, aesthetic design shown in FIG. 4E.

Referring to FIG. 3C, there is shown a fourth object, such as an office chair 60D, having base legs upon which a pole structure 62D is mounted. Towards upper end of pole structure 62D, there is a mounted seat 64D. Electronic hub device 12 may be mounted on pole structure 62D proximate to legs of office chair 60D placed in a facility, such as at office of a user. In an example use case, when user moves near office chair 60D, a motion sensor detects movement of user and automatically switches on and illuminates plurality of light sources 20 in an extending pattern from center towards periphery (FIG. 4H) or selective illumination in parts (FIG. 4I). Pre-stored soothing music may be rendered via speakers 48. In an instance, portion of frame 14 of electronic hub device 12 may include a geometric, for example, aesthetic design shown in FIGS. 4H and 4I.

Referring to FIG. 3D, there is shown a fifth object, such as a clinical chair 60E, having base legs upon which a pole structure 62E is mounted. Towards upper end of pole structure 62E, there is amounted seat 64E. Electronic hub device 12 may be mounted on pole structure 62E covering legs of clinical chair 60E placed in a facility, such as a hospital or clinic. In an example use case, when patient moves near clinical chair 60E, a motion sensor detects movement of patient and automatically switches on and illuminates plurality of light sources 20 along perimeter of electronic hub device 12 (FIG. 4G) or in text or graphic portions (FIG. 4G).

Pre-stored soothing music may be rendered via speakers 48. In an instance, portion of frame 14 of electronic hub device 12 may include a various patterns, for example, aesthetic design shown in FIGS. 4H and 4I.

The disclosed electronic hub device 12 is an easy-to-install decorative article that may be snapped over a base of a pedestal chair or office desk or computer chair to promote a business through aesthetic appeal. Artistic expression evident in chair would enhance the way one looks at chair. There are many advantages of electronic hub device 12. For example, electronic hub device 12 enables individuals and companies to bring their brand to life with creativity. Electronic hub device 12 makes it possible to showcase one's personality and bring ordinary hub objects to life. Electronic hub device 12 gives user a "superstar" effect. Electronic hub device 12 may be used for advertisement purposes also.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electronic hub device, comprising:
a frame being circular in shape and mounted around a pedestal support of a chair, wherein said frame includes a central aperture being circular in shape located on a center portion of said frame, wherein said central aperture receives said pedestal support of said chair, wherein said frame covers a ground surface and a base around said chair, wherein said frame is separated evenly into a first interlocking piece and a second interlocking piece, wherein said first interlocking piece includes at least one lock stick-out member along an edge of said first interlocking piece, wherein said second interlocking piece includes at least one lock insert opening located along an edge of said second interlocking piece, wherein said at least one lock insert opening is a hollow portion within said second interlocking piece, wherein said at least one lock stick-out member receives said at least one lock insert opening to create a secure attachment to said pedestal support, wherein said frame comprises:
one or more sensors configured to detect one or more events around said electronic hub device;
a plurality of light sources installed along a boundary of said frame configured to illuminate a portion of said frame within said boundary of said frame, wherein said portion of said frame includes promotional content selected based on user preferences; and
a processor configured to activate said plurality of light sources upon detection of said one or more events.

2. The electronic hub device of claim 1, wherein a central axis of said frame coincides with longitudinal axis of said pole structure of said object.

3. The electronic hub device of claim 1, wherein said one or more sensors are one or more of a motion sensor, an audio sensor, a proximity sensor, or a pressure sensor.

4. The electronic hub device of claim 1, wherein said one or more events correspond to a presence of another object within a proximity of said electronic hub device, a movement of said other object within said proximity of said electronic hub device, a voice command, an audio gesture, or a pressure exerted on said object.

5. The electronic hub device of claim 1, wherein a remote device, communicably coupled with said electronic hub device, configured to control one or more operations of said electronic hub device.

6. The electronic hub device of claim 5, wherein said one or more operations correspond to switching on said electronic hub device, switching off said electronic hub device, controlling a speaker device installed on said electronic hub device, or controlling a rotation of said electronic hub device.

7. The electronic hub device of claim 6, wherein said speaker device is surrounds said central aperture of said frame.

8. The electronic hub device of claim 1, wherein a battery is configured to provide power to at least said plurality of light sources, wherein said battery is powered from an external power supply.

9. The electronic hub device of claim 1, wherein said processor is further configured to activate an electric motor installed at inner portion of said frame.

10. The electronic hub device of claim 9, wherein said electric motor is configured to rotate said frame about a central axis of said frame around said pole of said object upon receiving an activation signal from said processor.

11. The electronic hub device of claim 1, wherein said processor is further configured to activate a speaker device installed at inner portion on upper surface of said frame, wherein said speaker device is configured to pair with one or more portable devices to generate an audio output.

12. The electronic hub device of claim 1, wherein said chair is a barber chair.

13. The electronic hub device of claim 1, wherein said chair is a salon chair.

14. The electronic hub device of claim 1 wherein said at least one lock stick-out member is an arrow shaped member configured to be received by said at least one lock insert opening.

15. An electronic hub device, comprising:
a frame being circular in shape and mounted around a pedestal support of a chair, wherein said chair is a barber chair, wherein said frame includes a cavity being an opening circular in shape located on a center portion of said frame, wherein said cavity receives said pedestal support of said chair, wherein said frame further includes a speaker surrounding said cavity, wherein said frame covers a ground surface and a base around said chair, wherein said frame is separated evenly into a first interlocking piece and a second interlocking piece, wherein said first interlocking piece includes three lock stick-out members along an inner edge of said first interlocking piece, wherein said three lock stick-out members are arrow shaped members, wherein said second interlocking piece includes three lock insert openings located along an inner edge of said second interlocking piece, wherein said three lock insert openings are hollow portions extending within said second interlocking piece, wherein said three lock stick-out members receives said three lock insert openings to create a secure attachment to said pedestal support, wherein said frame comprises:
one or more sensors configured to detect one or more events around said electronic hub device;
a plurality of light sources installed along a boundary of said frame configured to illuminate a portion of said frame within said boundary of said frame, wherein said portion of said frame includes promotional content selected based on user preferences; and a processor configured to activate said plurality of light sources upon detection of said one or more events.

\* \* \* \* \*